May 1, 1962     E. O. FRYE     3,032,715
MEANS FOR MEASURING RATE OF CHANGE OF FREQUENCY
Filed Jan. 2, 1959     3 Sheets-Sheet 1

INVENTOR.
EUGENE O. FRYE
BY
ATTORNEYS

May 1, 1962 E. O. FRYE 3,032,715
MEANS FOR MEASURING RATE OF CHANGE OF FREQUENCY
Filed Jan. 2, 1959 3 Sheets-Sheet 2

INVENTOR.
EUGENE O. FRYE
BY
Moody and Phillion
ATTORNEYS

United States Patent Office 3,032,715
Patented May 1, 1962

3,032,715
MEANS FOR MEASURING RATE OF CHANGE OF FREQUENCY
Eugene O. Frye, Marion, Iowa, assignor to Collins Radio Company, Cedar Rapids, Iowa, a corporation of Iowa
Filed Jan. 2, 1959, Ser. No. 784,601
4 Claims. (Cl. 324—82)

This invention relates generally to a device for measuring rates of change of frequency of a signal and more particularly to structure in which the rate of change of frequency can be measured in a small portion of a cycle of the signal.

There are many applications in which a determination of the rate of change of frequency of a signal is important. For example, a rate of change of frequency can be employed to determine the radial acceleration of some object with respect to a given point. More specifically, if a signal of constant frequency is reflected or transmitted from the moving object and received at said given point, the rate of change of said freqeuncy of said signal reaching said given point will be proportional to the radial acceleration of the moving object. The problem, then, is to translate this rate of change of frequency into a readable indication of the radial acceleration of the moving object.

In the prior art, for example, this has been accomplished by supplying the received signal directly to a mixer. Further, the received signal is supplied also to the mixer through a delay line. Owing to the changing frequency of the received signal, the output signal of the delay line is at a different instantaneous frequency than the frequency of said received signal. The difference in frequency, hereinafter referred to as the difference frequency, is proportional to the product of the rate of change of the frequency of the received signal and the length of the time delay. The mixer is constructed to be responsive to the aforementioned supplied signals to produce a resultant signal having said difference frequency; such difference frequency being proportional to the rate of change of the received signal and consequently being proportional to the rate of acceleration of the moving object.

There are, however, certain difficulties present in employing such difference frequency in determining the acceleration rate of an object. More specifically, it will be noted that due to the time delay network there will be a corresponding delay between the initiation of the rate of change of frequency of the received signal and the realization of such frequency change in the output signal of the delay line. Therefore, for good accuracy in measuring rapidly changing rates of change of frequency, it is necessary to have short time delay. However, a short time delay results in low rates of change of frequency producing very low difference frequencies. Since the usual methods of frequency measurement require that at least one period elapse before the frequency can be determined, such very low difference frequencies may require entirely too long to measure.

Consequently, to accurately measure rapidly varying rates of change of frequency, it is necessary to devise a means of measuring very low frequencies in a rapid manner.

An object of the invention is to measure low frequencies in a period of time less than the frequency period.

Another object of the invention is to provide means for quickly and accurately measuring rapidly varying rates of changes of frequencies, including low rates of change of frequency.

Other objects of the invention are to provide a simple, inexpensive, electronic accelerometer and to improve generally means for measuring rates of change of frequency.

In accordance with the invention there is provided means for receiving a signal whose frequency is subject to considerable variation, a time delay network for delaying said signal, and a first and second mixer means connected in parallel with respect to the output signal of the time delay network. The received signal is supplied also to said first mixer signal which responds thereto to produce an output signal whose frequency is equal to the difference between the frequency of the received signal and the frequency of the received, delayed signal, which difference frequency is indicative of the acceleration of the moving object. Also provided in the circuit is a phase shifting circuit for shifting the phase of the received signal. The output signal of the phase shifting circuit is supplied to said second mixer means which responds thereto to produce an output signal whose frequency also is equal to the difference frequency of the received signal and the frequency of the received, delayed signal, which difference frequency also is indicative of the acceleration of the moving object.

It will be noted, however, that due to the effect of the phase shifting circuit the phases of the output signals of the first and second mixer means are separated by an amount equal to the phase shift introduced by the phase shifting network. If the said phase shifting network introduces a phase shift of 90°, the output signals of the two mixer means will, when combined, form a rotating field at a frequency equal to the difference frequency of the received signal and the received, delayed signal. Such a rotating field is employed to drive some mechanical means having a rotatable shaft whose angular velocity is determined by the frequency of said rotating field. Thus the angular velocity of said shaft will vary in accordance with the rate of acceleration of the moving object. It is possible to measure the angular velocity of a rotating shaft in a small portion of a complete revolution thereof.

As an example of a particular mechanical means which can be employed in the invention, the rotating field can be employed to drive a two-phase motor capable of operating down to and including D.C. The instantaneous shaft speed of the motor will then equal the angular velocity of the rotating field at all times and will, therefore, be proportional to the rate of change of frequency of the received signal.

These above mentioned and other objects and features of the invention will be more fully understood from the following detailed description thereof when read in conjunction with the drawings, in which.

It is to be noted that corresponding elements in different figures herein are identified with similar reference characters (primed in succeeding figures).

Figure 1:
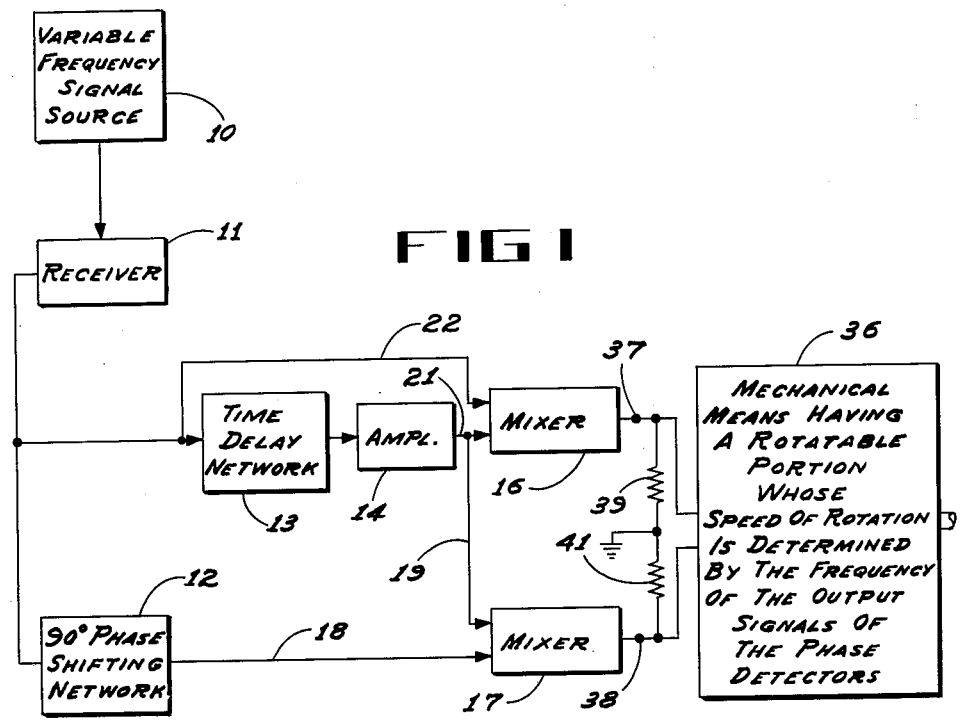
FIG. 1 is a block diagram of a preferred form of the invention.

Referring now to FIG. 1 the signal is received from a variable frequency signal source, designated generally as 10, by receiving means 11 which consists of the necessary receiver circuitry. The output signal of the receiving means 11 is supplied to the cascade arrangement of the time delay network 13 and the amplifier 14. The output signal of the amplifier 14 is supplied to the parallel arrangement of mixers 16 and 17. Further, the output signal of the receiver 11 is supplied directly to the mixer 16 and to the mixer 17 through the 90° phase shifting-network 12.

Thus it can be seen that to the mixer 16 there is supplied both the received signal and a delayed signal due to the effect of delay network 13. To the mixer 17 there is supplied a similar delayed signal and also a signal in quadrature with said received signal. The output signal of the mixer 17 will have a frequency equal to the difference frequency of the signals supplied thereto through conductors 18 and 19, which difference frequency will be proportional to the rate of change of the frequency of the received signal.

Similarly, the mixer 16 will be responsive to the signal supplied thereto through conductors 21 and 22 to produce an output signal whose frequency is equal to the difference frequency of the supplied signals and further whose frequency is indicative of the rate of change of the received signal. However, due to the effect of the 90° phase shifting network 12, the output signals of mixers 17 and 16 will have a phase difference of 90° although the frequencies will be the same. Thus, if the signals appearing at points 37 and 38 are supplied across windings positioned in space quadrature, there will be produced, as is well known in the art, a rotating electromagnetic field which can be employed to drive a suitable rotor, the angular velocity of which rotor will then be proportional to the rate of change of frequency of the received signal. The mechanical means 36, which has a rotatable portion, is constructed to respond to the said rotating field appearing across the points 37 and 38 to have said rotatable portion rotate at an angular velocity equal to the angular velocity of the rotating field.

Figure 2:
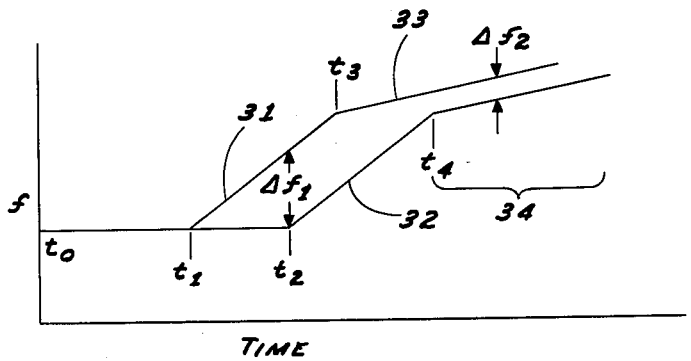
FIG. 2 is a graph illustrating the effect of the time delay network in the circuit.

Reference is made to the curves of FIG. 2 for the purpose of illustrating the effect of the time delay network 13 in the circuit. Assume that between the times $t_0$ and $t_1$ the frequency of the received signal is constant and that time $t_1$ the frequency of the received signal changes at a rate indicated by the portion 31 of the curve of FIG. 2. However, due to the time delay network 13, the signal appearing at the output of the amplifier 14 will not begin to change until the time $t_2$. It can be seen from FIG. 2, then, that the difference in frequency of the signals appearing on conductors 21 and 22 is $\Delta f_1$. This difference frequency will continue until the rate of change of frequency of the received signal changes again at time $t_3$, at which time the rate of frequency change decreases somewhat. Here again, due to the effect of delay network 13 this change in the rate of frequency change will not appear in the signal appearing on the conductor 21 until time $t_4$, at which time the difference frequency will then be as designated by $\Delta f_2$. An examination of the curve of FIG. 2 will reveal that the smaller the time interval between $t_1$ and $t_2$, which is equal to the time delay introduced by delay network 13, the more quickly will the difference frequency between the two signals accurately represent the rate of change of frequency of the received signal. It can also be seen from the examination of the curves of FIG. 2 that when the rate of change of the received signal is small as indicated by portion 34 of the curve, the difference frequency will be small and could take considerable time to measure if an entire period were required for such measurement. However, due to the production of a rotating field by the structure disclosed in this invention the difference frequency can be measured in less than a complete cycle thereof.

Figure 3:
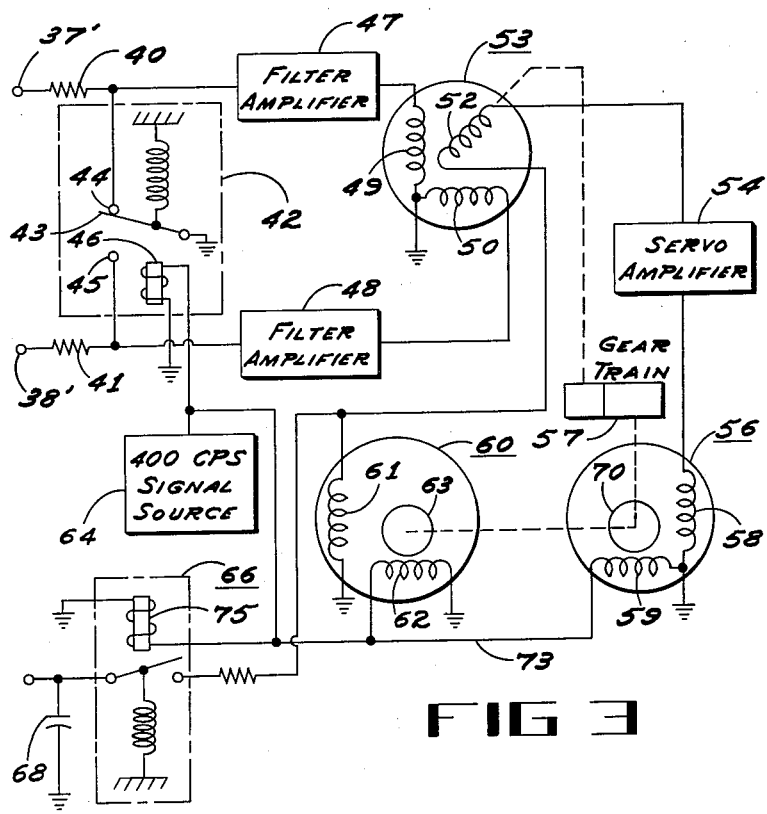
FIG. 3 shows a combined block diagram and schematic sketch of a means for translating the rotating field derived from the combined mixer output signals into a readable form.

Referring now to FIG. 3 there is shown a specific structure which may be employed in lieu of the load resistors 39 and 41, and the mechanical means 36 of FIG. 1. The output of mixers 16 and 17 are supplied respectively to the terminals 37' and 38'.

Figure 4:
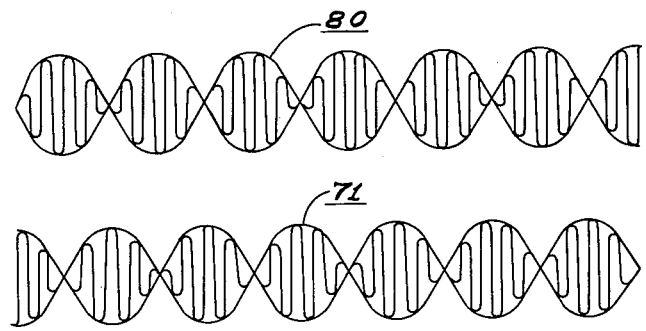
FIG. 4 shows waveforms to aid in the description of the structure of FIG. 3.

The outputs of the mixers 16 and 17 then are supplied to the resistors 40 and 41, respectively. Chopper 42, consisting of an armature 43 which alternately makes contact with contacts 44 and 45 in response to intermittent energization of electromagnet 46 by means of signal source 64, functions to superimpose an alternating current signal upon the output signals of the mixers 16 and 17. The last-mentioned alternating current signal has a frequency considerably higher than that of the output signals of mixers 16 and 17, and is employed in order to operate a servo-motor, as will be discussed in more detail later herein. Filter amplifiers 47 and 48, respectively, amplify the output signals of mixers 16 and 17 after the chopping function. Such output signals are represented by the waveforms 80 and 71 of FIG. 4 wherein the low frequency components represent the output signals of the mixers and the high frequency components represent the effect of the chopper. These output signals of amplifiers 47 and 48 will be applied to quadrature-spaced windings 49 and 50 which will result in the production, in accordance with well-known principles, of a rotating magnetic field.

The armature 52 of the synchro resolver 53 will follow the aforementioned rotating field by virtue of the action of the servo amplifier 54, servo-motor 56, and gear train mechanism 57, which is mechanically coupled to the armature 52 of resolver 53. It can be seen that if the armature 52 remains at right angles to the rotating field no voltage will be induced therein as a result of said rotating field. However, should the armature 52 either lead or lag the rotating field, voltages will be induced therein having relative phases of either 0 degrees or 180 degrees depending on whether the armature 52 is leading or lagging said rotating field. This signal is applied to one winding 58 of the servo-motor 56 through servo amplifier 54. A signal of the same frequency, but of a constant phase, is supplied through lead 73 to the other winding 59 of servo-motor 56 from 400 cycle per second (c.p.s.) signal source 64. The direction of rotation of the armature 70 of the servo-motor will then depend upon the phase of the signal supplied to the winding 58, and is such as to correct leading or lagging of the armature 52 through gear train 57. A tachometer 60 is mechanically coupled to the servo-motor 56 and has two windings 61 and 62 arranged in space quadrature with respect to the armature 63.

One of these windings 62 is supplied with a signal from source 64, said signal having a constant phase. The signal generated by induction in winding 61 then will have a frequency equal to the frequency of the signal supplied to winding 62, an amplitude proportional to the speed of rotation of the armature 63, and a phase in accordance with the direction of rotation of the armature 63. The voltage thus appearing across winding 61 is employed for two purposes. First, being 180° out of phase with the voltage generated in armature winding 52 of synchro resolver 53, it functions to prevent the voltage generated in said armature winding 52 from becoming too large, which occurrence would be apt to cause overshooting and consequent hunting of the armature 52. Secondly, the voltage across the winding 61 is supplied to a chopper 66 for the following reason.

As indicated above the phase of the voltage appearing across the winding 61 will shift 180° when the rotation of the armature 63 is reversed; consequently, since the electromagnet 75 of chopper 66 is energized by a signal having a constant frequency, the effect of the chopper 66 will be to provide a series of pulses to the capacitor 68 which will have either a positive or a negative direct current component, depending upon the direction of rotation of the armature 63, and having an amplitude proportional to the speed of rotation of the armature 63.

It can be seen from the foregoing that the speed of the rotating field generated in the windings 49 and 50 of the synchro resolver 53 can be read on a meter connected to the tachometer, or, conversely, it can be determined by the magnitude of the direct current voltage accumulated on the capacitor 68.

Figure 5:
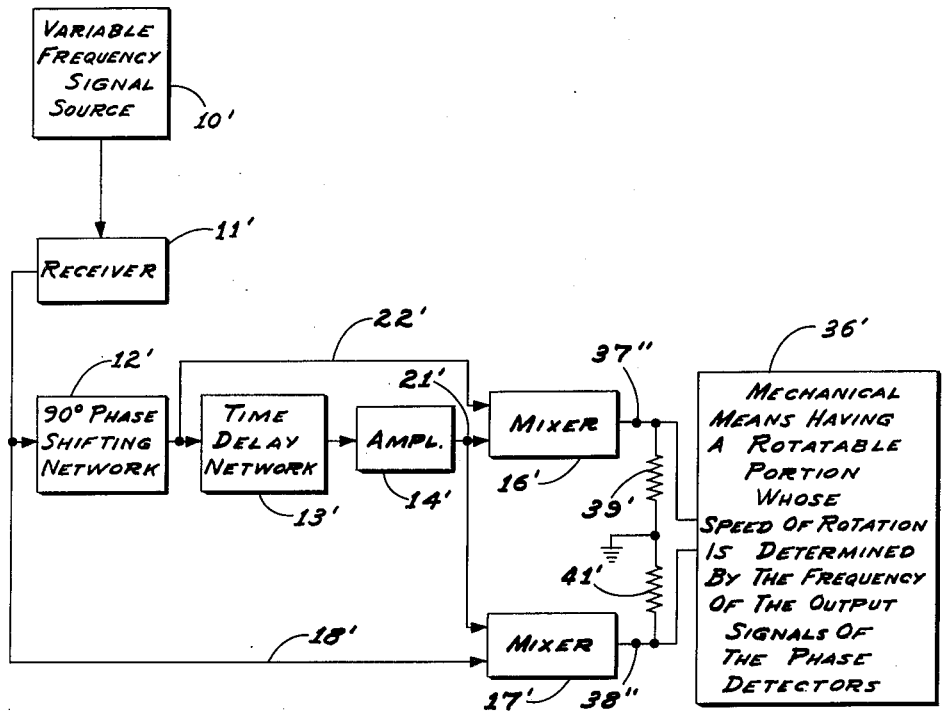
FIG. 5 shows an alternative form of the invention.

It is to be specifically noted that the phase shifting circuit of FIG. 1 can be employed at different points in the circuit. For example, as shown in FIG. 5 the phase shifting circuit may be positioned in series with the series arrangement of the time delay network 13' and the amplifier 14' rather than in parallel therewith. The important consideration is that a delayed signal is supplied to each of the mixers 16' and 17' and that the received signal also is supplied to the mixers 16' and 17', but in phase quadrature.

It is to be noted further that other changes may be made in circuit arrangement, and in types of circuits employed, and in the means for indicating the angular velocity of the rotating field without departing from the spirit or the scope of the invention.

I claim:
1. Means for measuring the rate of change of frequency of a signal comprising first mixer means, second mixer means, means for delaying said signal and for supplying said delayed signal to said first and second mixer means, means for supplying said signal directly to said first mixer means, and phase shifting means for shifting the phase of said signal and supplying said phase shifted signal to said second mixer, said first mixer means and said second mixer means constructed to respond to the signals supplied thereto to produce output signals which have a frequency equal to the difference frequency between the signal supplied thereto, means for combining the output signals of said first and second mixer means to produce a rotating field, and motor means having a rotatable shaft and constructed and arranged to be responsive to said rotating field to cause said rotatable shaft to rotate at an angular velocity substantially equal to the angular velocity of said rotating field.

2. Means for producing a rotating field whose angular velocity is representative of the rate of change of frequency of a given signal comprising means for receiving said given signal, phase shifting means for shifting the phase of the received signal a predetermined phase angle, means for delaying said received signal, first mixer means constructed and arranged to be responsive to the phase shifted received signal and to said delayed signal to produce a first output signal whose frequency is equal to the difference frequency of the applied signals, which difference frequency varies in accordance with the rate of frequency change of said received signal, second mixer means constructed and arranged to respond to said delayed signal and to said received signal to produce a second output signal whose frequency is instantaneously equal to the frequency of said first output signal and whose phase is different from the phase of said first output signal by an amount equal to the phase shift produced in the received signal by said phase shifting means, means for combining said first and second output signals to produce said rotating field, and mechanical means having a rotatable shaft and responsive to said rotating field to cause said rotatable shaft to rotate at an angular velocity substantially equal to the said angular velocity of said rotating field.

3. Means for measuring the rate of change of frequency of a given signal comprising means for shifting the phase of said given signal a predetermined amount, means for delaying said given signal, first mixer means constructed and arranged to respond to said delayed signal and said given signal to produce a first output signal whose frequency varies as the rate of change of frequency of said given signal varies, second mixer means constructed and arranged to respond to said delayed signal and to the output signal of said phase shifting means to produce a second output signal whose frequency is equal to the frequency of said first output signal and whose phase is shifted from the phase of said first output signal by an amount equal to the phase shift introduced into said given signal by the phase shifting means, means for combining said first and second output signals to produce a rotating magnetic field, synchro resolver means comprising a rotor having a rotatable shaft and responsive to said rotating magnetic field to produce a voltage in said rotor indicative of the position of said rotor with respect to said rotating magnetic field, means including servo motor means and coupling means responsive to the voltage produced in said rotor to alter the angular position of said rotor to maintain a predetermined position with respect to said rotating magnetic field.

4. Means for producing a rotating field whose angular velocity varies as the rate of change of frequency of a given signal comprising means for receiving said given signal, phase shifting means for shifting the phase of the received signal a predetermined phase angle, means for delaying said received signal, first mixer means constructed and arranged to be responsive to said received signal and to said delayed signal to produce a first output signal whose frequency varies as the rate of frequency change of said received signal, second mixer means constructed and arranged to respond to said delayed signal and the output signal of said phase shifting means to produce a second output signal whose frequency is equal to the frequency of said first output signal and whose phase is different from the phase of said first output signal by an amount equal to the phase shift produced in the received signal by said phase shifting means, means for combining said first and second output signal to produce a rotating magnetic field, synchro resolver means comprising a rotor having a rotatable shaft and responsive to said rotating magnetic field to produce a voltage in said rotor indicative of the position of said rotor with respect to said rotating magnetic field, means including servo motor means and coupling means responsive to the voltage in said rotor to alter the angular position of said rotor to maintain a predetermined position with respect to said rotating magnetic field.

References Cited in the file of this patent
UNITED STATES PATENTS

| | | |
|---|---|---|
| 2,480,128 | Frum | Aug. 30, 1949 |
| 2,539,905 | Herbst | Jan. 30, 1951 |
| 2,553,558 | Earp | May 22, 1951 |
| 2,580,148 | Wirkler | Dec. 25, 1951 |
| 2,856,522 | Bachmann | Oct. 14, 1958 |
| 2,896,162 | Berger | July 21, 1959 |
| 2,902,649 | Bachmann | Sept. 1, 1959 |

FOREIGN PATENTS

| | | |
|---|---|---|
| 583,794 | Great Britain | Dec. 31, 1946 |